(12) United States Patent
Dowse

(10) Patent No.: US 7,787,438 B2
(45) Date of Patent: Aug. 31, 2010

(54) DELAY MEASUREMENTS IN NETWORK TRAFFIC

(75) Inventor: Ian Edward Dowse, Blackrock (IE)

(73) Assignee: Corvil Limited, Dublin (IE)

( * ) Notice: Subject to any disclaimer, the term of this patent is extended or adjusted under 35 U.S.C. 154(b) by 557 days.

(21) Appl. No.: 11/673,482

(22) Filed: Feb. 9, 2007

(65) Prior Publication Data

US 2008/0151771 A1 Jun. 26, 2008

(30) Foreign Application Priority Data

Dec. 22, 2006 (EP) .................................. 06127122

(51) Int. Cl.
*H04J 3/06* (2006.01)
(52) U.S. Cl. ....................... 370/350; 370/503; 713/400; 713/401; 345/619
(58) Field of Classification Search ................. 370/252, 370/350, 503; 345/619, 650; 713/400, 401
See application file for complete search history.

(56) References Cited

U.S. PATENT DOCUMENTS

| | | | |
|---|---|---|---|
| 5,521,907 | A | 5/1996 | Ennis, Jr. et al. |
| 2001/0016876 | A1 | 8/2001 | Kurth et al. |
| 2001/0050903 | A1* | 12/2001 | Vanlint ........................ 370/252 |
| 2002/0133733 | A1* | 9/2002 | Abdel-Ghaffar ............ 713/500 |
| 2002/0188888 | A1* | 12/2002 | Rivoir .......................... 714/25 |
| 2003/0053419 | A1* | 3/2003 | Kanazawa et al. .......... 370/252 |
| 2006/0222126 | A1* | 10/2006 | Edwards et al. ............. 375/354 |

FOREIGN PATENT DOCUMENTS

| | | |
|---|---|---|
| EP | 1 206 067 A1 | 5/2002 |
| EP | 1 487 152 A1 | 12/2004 |
| WO | WO 2006/033611 A1 | 3/2006 |

OTHER PUBLICATIONS

Matthew MacDonald, Peter Meyers, Sarah Milstein, "Excel: the missing manual", 2004, O'Reilly, pp. 435-437.*
Graham, I. et al.: "Comparative Measurement of QOS on the Trans-Pacific Internet" Proceedings of the SPIE, SPIE, Bellingham, VA, US, vol. 3529 Nov. 2, 1998 pp. 289-294.
Mark, L. et al.: "Passive One-Way Delay Measurement" IETF Standard-Working-Draft, Internet Engineering Task Force, IETF, CH, Jun. 2003.
Almes et al., "A One-Way Delay Metric for IPPM ", IETF Standard, Internet Engineering Task Force, IETF, CH, Sep. 1999.

(Continued)

*Primary Examiner*—Huy D Vu
*Assistant Examiner*—Omer Mian
(74) *Attorney, Agent, or Firm*—Schwabe, Williamson & Wyatt, P.C.

(57) ABSTRACT

A methodology and network tool for evaluating one-way directional delays in a packet network is described. The invention provides for a discrimination of the directional components of the delay experienced by packets travelling between nodes in a network. This identification of the directional delay component assists in an understanding of network behaviour and can be represented on a graphical user interface. Such methodologies are achieved without requiring clock synchronisation between clocks at each of the nodes.

26 Claims, 6 Drawing Sheets

OTHER PUBLICATIONS

Moon et al., "Estimation and Removal of Clock Skew from Network Delay Measurements" Proceedings. IEEE New York, NY, USA (Mar. 21, 1999).

Wu et al., "Reliable Clock Skew Estimation Algorithm for One-Way Measurements", IEEE Piscataway, NJ, USA, dated: 2004.

Cotroneo et al., "Reliable Monitoring of Network-Related Performance Paremeters in Wireless Environments", IEEE Piscataway, NJ USA, dated: 2005.

Partial European Search Report dated May 30, 2007 for EP App. No. 06127122 (7 pages).

* cited by examiner

DELAY MEASUREMENTS IN NETWORK TRAFFIC

CROSS-REFERENCE TO RELATED APPLICATION

This is a United States nonprovisional application based upon European Patent Application Number EP06127122.7, filed Dec. 22, 2006, and claims priority to said EP06127122.7 Application.

FIELD OF THE INVENTION

The invention relates to delay measurements in network traffic, and more particularly to an estimation of the one-way delay between two nodes in a network. The invention more particularly relates to such measurements which are provided without requiring clock synchronization between the clocks at each of the two nodes. The invention particularly relates to a methodology useful in providing such measurements, a tool that can be implemented within a network architecture to provide such a methodology and a display tool that can be used for subsequent analysis of the measurements calculated

BACKGROUND

Within the context of network architectures there are two primary known approaches to packet delay measurement between points A and B in the network.

The first utilizes a measurement of the complete round-trip time for a packet travelling from point A to point B followed by another packet that subsequently travels from point B to point A. The round trip time is determined by subtracting the time that the first packet departed point A from the time that the second packet arrived at point A. Since both time stamps come from the same time source, clock synchronization is not required. To achieve this measurement, packets can either be injected (e.g. with a responder service that sends a reply back to the sender), or else timestamps can be transmitted for existing application packets by appending a header or sending the timestamps out of band. It is possible to compensate for the additional delay between the first packet being received and the second packet being sent at location B, by measuring the time difference at point B and subtracting it from the original round-trip time. While this known methodology provides an indication of the round trip measurement it suffers in that there is no indication of how the packet delays are distributed between the two directions. The assumption that traffic delay is symmetrical between two locations is not a valid assumption as the time taken by the packet in one direction is often quite different from the time taken in the other direction.

Another known technique is to measure one-way delays using synchronized clocks, such as GPS or radio based time sources. A timestamp is recorded when a packet leaves or passes point A, and a second timestamp is recorded when the packet subsequently arrives at or passes point B. Since the clocks are synchronized, the difference between these timestamps is the one-way delay. In this technique, the timestamps from point B need to be transmitted back to point A (or vice versa) for subtraction. This can be performed as a response packet, a timestamp header or some out-of-band timestamp communication.

While this method does provide an estimation of the one-way packet delays, synchronized clocks of sufficient precision are difficult and expensive to deploy in practice. For example, GPS receiver antennas require an unobstructed view of the sky, so considerable antenna cabling or clock signal distribution infrastructure is typically required.

It has also been found that network-based time synchronization available today (e.g. Network Time Protocol (NTP), an internet protocol that is based on the UDP protocol) is unable to provide sufficiently accurate synchronization for most network delay measurements. In particular, when attempting to measure network delays while using the same network for NTP synchronization, the time synchronization errors are typically larger than many measured packet delays. This results in anomalies such as measuring some one-way packet delays as negative.

Some approaches attempt to compensate for unsynchronized clocks by subtracting the most negative time difference from all the others. This does not take into account the variation over time of the clock offset between unsynchronized clocks, and therefore cannot be considered as providing an accurate estimation of the delay. Within this context it will be appreciated that the variation between clocks can be characterized as having a number of components—offset, skew and drift. Within the present specification these terms will be understood as follows—offset is the time difference between clocks, skew is the rate at which the offset changes with time, and drift is variation of the skew with time.

Other known approaches include "best fit" statistical modeling of delay estimates and clock parameters. For example the statistics of round-trip delay estimates from different paths through the network can be combined to provide a better statistical model of the one-way delays experienced by a single path through the network. Best fit modeling can also be used to compensate for clock skew when comparing recorded traces of packet timestamps from hosts with unsynchronized clocks. These approaches may improve the accuracy of simplistic one-way delay estimates, but they cannot provide reliable information about one-way delays, especially for individual packets.

There is therefore still a need to provide a method that can provide information for individual packets. There is a further need to provide a method to measure accurately the variable component of one-way point to point packet delays without the need for synchronized time sources.

SUMMARY

These and other needs and problems are addressed by a methodology in accordance with the teaching of the invention that provides for a measurement of one-way point to point packet delays without requiring a synchronization of clocks at each of the two points. A method according to the teaching of the invention uses a continuous sequence of packet send and receive timestamps to provide information on relative clock offset, skew and drift between the time sources at monitoring points. As the pair of unsynchronized send and receive timestamps for each new packet is processed, the method provides an upper and lower bound on the one-way delay experienced by each packet.

Accordingly the invention provides a method according to claim 1 with advantageous embodiments provided in the dependent claims. A network analysis tool is also provided.

These and other features of the invention will be better understood with reference to the following drawings.

DETAILED DESCRIPTION OF THE DRAWINGS

The invention will now be described with reference to exemplary embodiments which are useful in an understanding of the invention. These exemplary embodiments are provided with the understanding that the teaching of the invention should not be construed as being limited to these specifics examples, in that the scope of protection should be interpreted solely with reference to the claims that follow.

According to the teaching of the invention it is possible to divide the combined delay of a packet going from point A to point B and subsequently a packet from B to A into three components:

D1: a delay that is a lower bound on the one-way delay of the packet that traveled from A to B D2: a delay that represents the portion of the combined time for which it was not possible to attribute a direction to the delay experienced.

D3: a delay that is a lower bound on the one-way delay of the packet that traveled from B to A Together, these three components add up to the sum of both packets' delays, so D1+D2+D3 is equal to the round-trip time between the two locations. Using such an understanding it will be understood that the delay experienced by a packet travelling from A to B can be determined from knowledge of D1 and D2, whereas the delay traveled in the other direction can be determined from knowledge of D3 and D2. As the delay represented by D2 cannot be attributed to either direction in preference to the other direction, it forms a constituent of both delay measurements.

Figure 1:
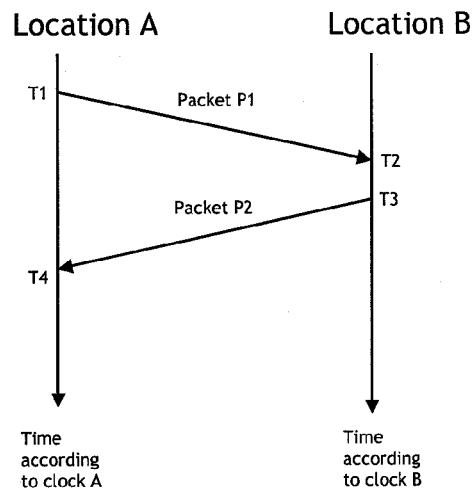
FIG. 1 is a schematic showing a return trip between two locations within a network.

Using this teaching, FIG. 1 shows two packets, P1 and P2. Packet P1 is transmitted from location A, and a timestamp of T1 is recorded from clock A. Packet P1 then arrives at location B, and a timestamp of T2 is recorded from clock B. Subsequently, a second packet P2 is transmitted from location B, and a timestamp T3 is recorded from clock B. Finally, when packet P2 arrives at location A, a timestamp T4 is recorded from clock A. In all, the round trip between A and B generates 4 time stamps; T1, T2, T3, T4.

Figure 2:
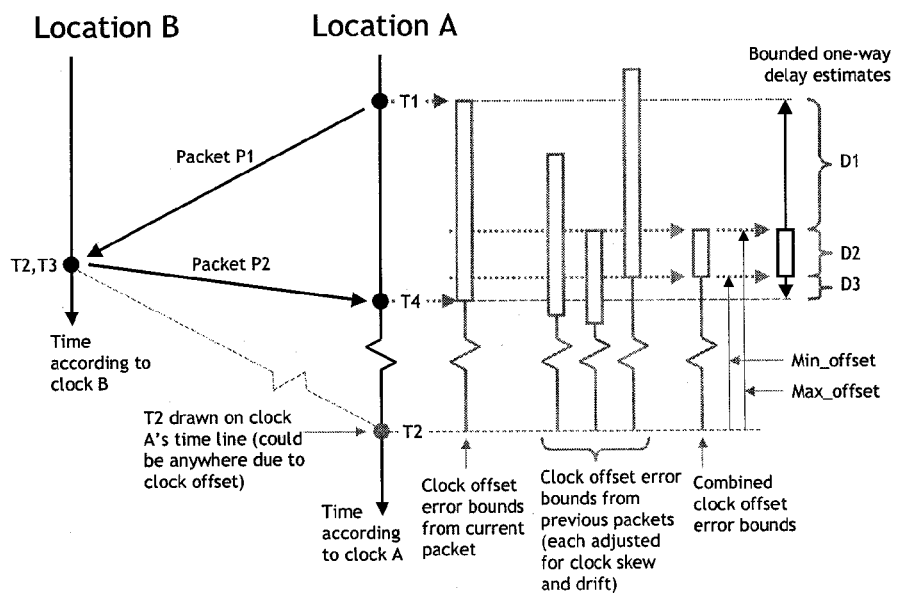
FIG. 2 is a schematic showing how clock times recorded at each of the locations of FIG. 1 can be used to bound the delay in unidirectional traffic between the two locations.

FIG. 2 shows a simplified view of the method's operation where timestamps T2 and T3 are identical, i.e. the assumption being that the packet arrived and departed from B at the same time. This simplification will be appreciated is provided for an assistance in the understanding of the methodology of the invention but is not necessary for the operation of the method. It will be understood that as the clocks at each of locations A and B are not synchronized that the times from each of the different clocks cannot be compared directly due to the unknown clock offset that is inherently present between unsynchronized clocks. However using the assumption that a first packet, packet P1 cannot have arrived at location B before it was sent from location A, and neither can P2 have arrived at location A before it was sent from location B, it is possible to give bounds on the clock offset:

$$T3-T4 < \text{offset} < T2-T1 \qquad \text{eqn. 1}$$

Here "offset" represents the time offset between the two clocks, i.e. $B(t)-A(t)$ where $A(t)$ and $B(t)$ represent the reading on clocks A and B respectively as a function of an "absolute" time. These bounds are valid during the time period represented by T1 to T4, but since clock offsets vary with time in practice—due to effects such as skew and drift, the bounds need to be widened when extrapolated to later times.

It will be understood that equation 1 represents a slight simplification, provided for the ease of understanding, as to how the offset may be determined. For example, the two clocks may be running at slightly different frequencies (skew), so if for example T2 was a long time period before T3 and clock B was running faster than clock A then it is possible for T3−T2 to exceed T4−T1. To cater for such anomalies or occurrences it is possible to either discard such samples, or alternatively to use the skew estimate S to improve this estimation. In practical implementations decisions may be made to discard samples if the T3−T2 time is so large that $(T3-T2)*(ABS(S)+D)$ is a significant fraction of $(T4-T1)-(T3-T2)$. Alternatively as mentioned above, specific compensation may be utilized to factor for such time lags.

Typical network clocks are based on crystal oscillators with a frequency error (skew) that varies with temperature and other factors, but the skew is typically less than 100 parts per million. This skew can be modeled or characterized as a long-term fixed component of frequency error, and then an unknown but bounded short-term drift from the long term skew. Such characterization allows the clock offset bounds from one packet pair observation to be extrapolated to provide base clock offset bounds for times after the initial T1 to T4 range:

$$T3-T4+(tA-T4)*(S-D) < \text{offset} < T2-T1+(tA-T4)*(S+D) \qquad \text{eqn. 2}$$

Here tA represents some time reading on clock A after T4, S is an estimated long-term relative skew between the clocks (which can be positive or negative), and D is a positive estimate of the maximum drift. (It will be noted that in the following description pertaining to FIG. 3 that the parameter tA is referred to as the subscript "i" parameter).

After each bidirectional packet pair is observed, the clock offset bounds computed directly from the packet pair can be compared with the clock error bounds carried forward from previous packet pairs via the skew adjustment. This allows the clock offset bounds to be narrowed whenever a bound from the new observation is more strict than a bound carried forward from previous observations. In this way multiple iterations of round trip measurements can be used to reduce the bound parameter and therefore give a more accurate estimation of the distribution of the delay in each direction.

Due to the variable nature of packet delays observed in practice, the offset bounds computed from most packets do not narrow the carried forward clock offset bounds. This means that timestamps from most packets can provide useful one-way delay information in the form of a bounded one-way delay.

As mentioned above, each bidirectional packet pair yields the three one-way delay bound parameters D1, D2 and D3. For convenience, these can be converted to simple delay estimates for each packet:

$$D_{P1}=D1+D2/2 \text{ (Error bound is +/−D2/2)} \quad \text{Eqn. 3}$$

$$D_{P2}=D3+D2/2 \text{ (Error bound is +/−D2/2)} \quad \text{Eqn. 4}$$

These delay estimates are in a convenient format for storage (e.g. as a history or distribution of values) and can also be easily displayed for subsequent interpretation such as by plotting on a graph. In effect, one can store each generated delay bound parameter for subsequent analysis of the traffic behavior over time.

Figure 3:
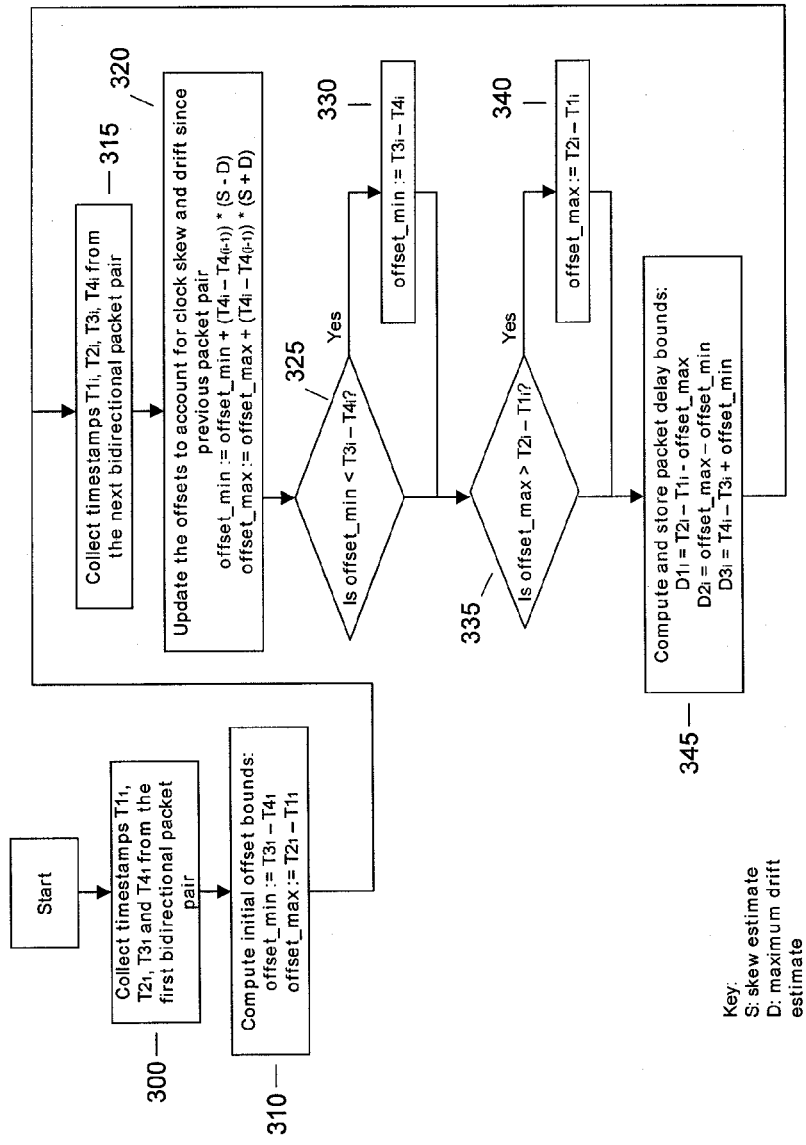
FIG. 3 is a schematic of a methodology used in accordance with the teaching of the invention to provide for an estimation of the packet delay bounds.

FIG. 3 shows how sequential round trip measurements may be utilized to form these bounded measurements. The process starts with a collection of timestamps $T1_1$, $T2_1$, $T3_1$, $T4_1$ from a first bidirectional (i.e. round trip) pair—Step 300. The initial offset bounds can be calculated from these round trip measurements using a modification of Equation 1 above—Step 310.

$$\text{Offset\_min}=T3_1-T4_1 \quad \text{Eqn. 5}$$

$$\text{Offset\_max}=T2_1-T1_1 \quad \text{Eqn. 6}$$

These values are stored in a buffer for use in subsequent iterations of the computational analysis. In Step 315, time stamps $T1_i$, $T2_i$, $T3_i$, $T4_i$ from a subsequent round trip are collected. These new time stamps can be used in combination with the offsets stored from Eqn. 5 and 6 to update the offsets to account for the skew and clock drift inherent in the clocks since the previous measurement. This is shown in Step 320 and uses the formula previously presented in Eqn. 2

$$\text{Offset\_min}=\text{Offset\_min}+(T4_i-T4_{(i-1)})*(S-D) \quad \text{Eqn. 7}$$

$$\text{Offset\_max}=\text{Offset\_max}+(T4_i-T4_{(i-1)})*(S-D) \quad \text{Eqn. 8}$$

If the calculated offset_min is less than that resultant from the new parameters, the value of the offset_min that is stored is updated accordingly (Steps 325, 330). Otherwise the old value is maintained as the current best estimate for the bounded value of the minimum offset. Similarly and as shown in Steps 335, 340 if the old value of the offset_max is greater than the new computation result, then the new computation result is updated as the estimate parameter. In this way the values of the offset are constrained or improved by subsequent iterations of the computation.

Using these new values it is possible to calculate the component of the round trip measurement delay that can be attributed to each direction (Step 345).

$$D1_i=T2_i-T1_i-\text{offset\_max} \quad \text{Eqn. 9}$$

$$D2_i=\text{offset\_max}-\text{offset\_min} \quad \text{Eqn. 10}$$

$$D3_i=T4_i-T3_i+\text{offset\_min} \quad \text{Eqn. 11}$$

Clock Skew and Drift Estimation

While the output of the iteration of FIG. 3 provides for an estimation of the portion of each round trip measurement that can be attributed to each direction of packet flow, in order to keep the clock offset bounds as narrow as possible, an embodiment of the method according to the teaching of the invention dynamically tracks and updates the clock parameters S and D. Each time the offset bounds are updated by a bidirectional packet pair, the changes in offset bounds are fed into the clock parameter estimator, which may be implemented in the network as either a software and/or hardware module. This estimator includes computation means configured to provide for an update of the S and D parameters, which are then used by subsequent bounded one-way delay calculations.

Figure 4:
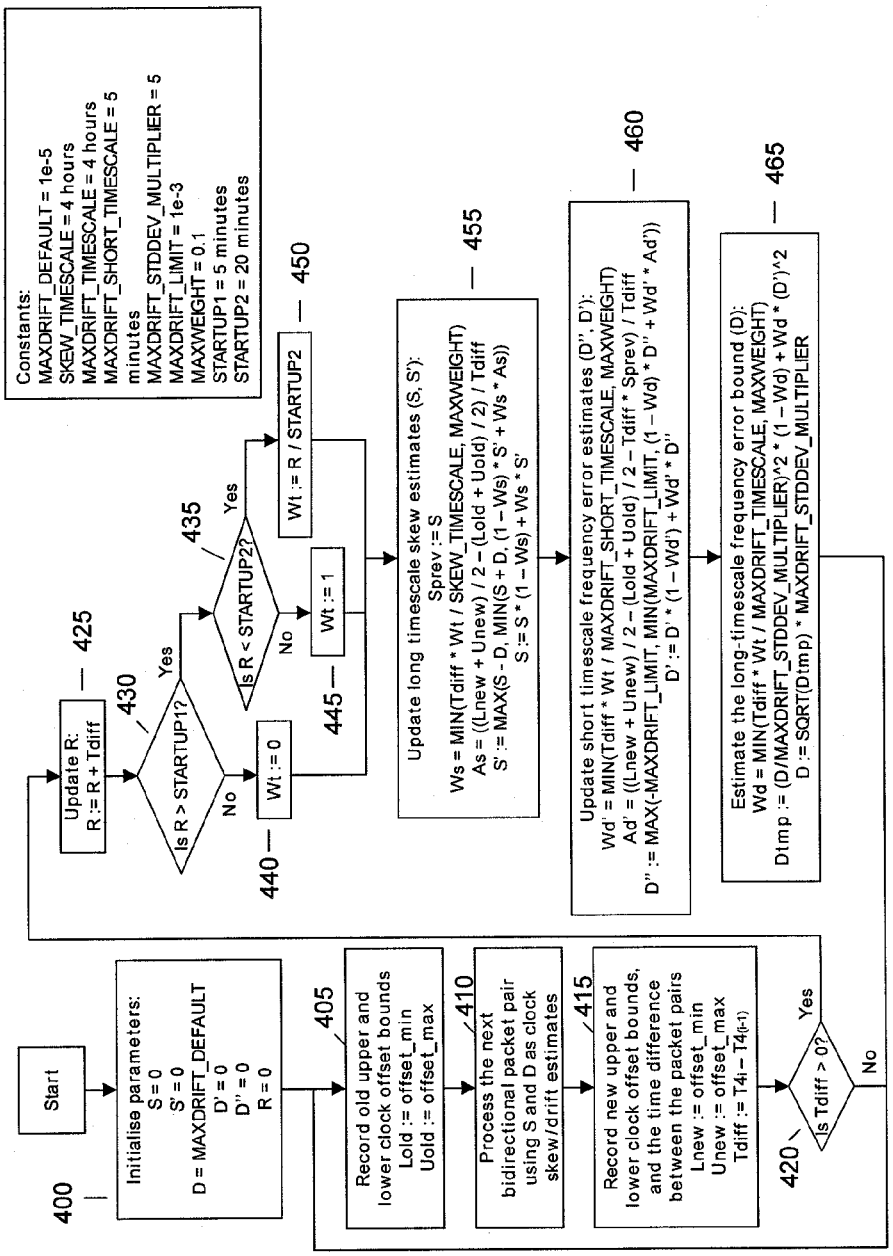
FIG. 4 is a schematic of a methodology used in computation of clock drift and skew over time, as used within the context of the teaching of the invention.

FIG. 4 shows an example of the operation of such an estimator. The estimator consists of three stages:

1) Estimation of the long-term clock skew uses a chained pair of exponentially weight moving average estimators with a fixed history timescale. The first stage output is capped to fall between S−D and S+D to ensure that apparent skews exceeding the current maximum drift estimate mainly result in the maximum drift estimate widening first.

2) A short-term drift estimate is computed by comparing the recent changes in clock offset from those predicted alone by the skew estimate S. A chained pair of exponentially weight moving average estimators is used here also. This first stage output is capped to fall within fixed sanity limits, which may be determined based on the nature of the network implementation. For example, in the arrangement of FIG. 4 it is shown that the error between the two clocks is not more than 1 part per thousand, i.e. +/−0.001. This parameter is chosen based on known clock behavior where for example it is known that individual clocks do not drift by more than 500 parts per million and as there are two clocks involved, it is acceptable to assume that the two clocks will not exceed ¹/₁₀₀₀ error.

3) Finally, the long-term drift upper bound D is updated. This is typically a scaled, exponentially weighted variance estimate for the short-term drift estimate and could be based on any one of a number of appropriate statistical methodologies. For example, as the long term drift upper bound D is used to estimate an upper bound on the variation in skew an estimate based on 5 times the measured standard deviation is used.

As a result of these three calculations it is possible to update the bounded measurement value, and then to extrapolate from an understanding of the values of each of D1, D2 and D3 the actual one way traffic delay experienced by that traffic.

The specifics of how these three values may be updated will now be described with reference to the exemplary embodiment of FIG. 4. As with any iterative process it is necessary to first define the parameters that will be used. Each of the skew and drift values are defined for first and subsequent iterations (Step 400):

S=0

S'=0

D=maxdrift_default, which is desirably established as a default value within the set up process, for example as shown in the constants box of FIG. 4, D=0.0001

D'=0

D"=0

R=0 and represents the accumulated running time of the system. It is initialized to 0 and updated with each new sample. By having a value for the running time of the system it is possible to ensure that a settle time is observed during initial operation of the system to ensure that spurious data is not used within the context of the methodology.

The upper and lower bounds are determined from the current value of the maximum and minimum values of the calculated offset (Step 405). Using the current values of the clock skew and drift it is possible to then process the next iteration of recorded bidirectional round trip time stamps (Step 410). This will allow an estimation of the new upper and lower bounds and also the time difference between the measured round trips (Step 415). As long as there is a time difference (Step 420), i.e. that the current measurement has occurred a time period subsequent to the first measurement, then the parameter R can be updated to reflect the time difference measured (Step 425). This computed R parameter is then compared to predefined startup parameters (Startup1—Step 430), (Startup2—Step 435) and depending on the output of this comparison a weighting value is determined as being Wt=0 (Step 440), Wt=1 (Step 445), Wt=r/Startup2 (Step 450). As mentioned above the running time R is monitored and the Wt parameter is used to defer estimation of clock parameters for a time when the system first starts up, and then incrementally increase its operation until it reaches a final level where the Wt parameter is equal to 1.0. This is important because during the first few minutes of operation, the ratio of typical packet delays to the total accumulated running time can be larger than the actual clock skew and drift rates. This dampening of the estimation during startup prevents such normal delay variation from being interpreted as clock skew or drift, which it is not. Once the system has been running for tens of minutes, the ratio of typical delay variation to total accumulated run time becomes insignificant, and estimation of clock skew and drift can begin. Therefore it will be understood that the network tool which is configured to operate a methodology according to the teaching of the invention iterates through a weighting value calculation until the running time of the system is greater than a predetermined value, which is chosen to be sufficient to allow the startup anomalies highlighted above to be non-significant.

Using these parameters each of the long-term clock skew (S, S') (Step 455), short-term drift estimate (D",D') (Step 460) and the long-term drift upper bound D (Step 465) may be updated.

Implementation—Active

Figure 5:
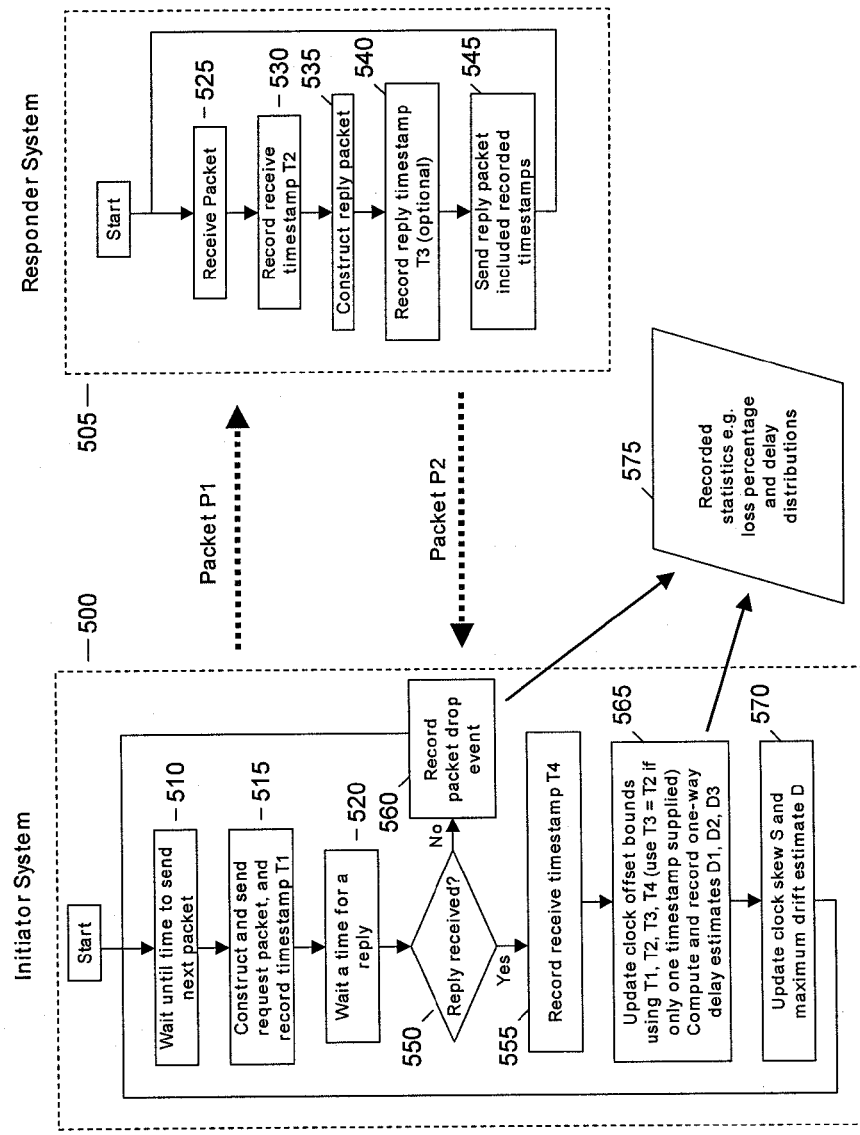
FIG. 5 is an example of a network tool that may be used in accordance with the teaching of the invention to provide for measurement of delay within the network.

We now describe an exemplary apparatus, with reference to FIG. 5, that computes and records bounded one-way delay estimates using the teaching of the above methods by sending packets from an initiator system, 500, to a responder system, 505, and processing replies back on the initiator system. It will be understood that while the teaching of the invention provides for an estimation of the delay experienced in a single direction, it does use data from round trip measurements.

The initiator system first initializes its clock offset, skew and drift parameters according to the bounded one-way delay and clock parameter estimation method as described above and in FIG. 4.

The initiator system periodically sends a request packet to a pre-determined responder system (Step 510). These packets could use any format or protocol, e.g. IP, UDP, Ethernet etc. In particular, the Network Time Protocol UDP packet format is convenient, since existing NTP servers already return suitable timestamps in response to NTP "client mode" requests. The initiator system records a timestamp using its local time source for the time it sent its request packet to the responder (Step 515). This timestamp corresponds to T1 in the bounded one-way delay estimation method of FIG. 3.

The initiator system now begins waiting for a reply to be received, using a timeout to ensure that it will not wait forever in the event that a reply is not received (Step 520).

If the request packet is successfully received (Step 525) at the responder system then the responder records a timestamp (Step 530) for the packet's arrival using the responder system's time source. This is called T2. It then constructs a reply (Step 535), which contains timestamp T2, and sends this reply back to the initiator system (Step 545). Where possible, the responder also uses its local time source to record a second timestamp T3 (Step 540) in the reply packet immediately before transmitting it. This will allow the initiator to at least partially compensate for processing delays at the responder system so that a more accurate network delay can be measured.

If the reply packet is successfully received (Step 550) back at the initiator system within the period defined by the timeout, then the initiator system records a receive timestamp T4 using its own time source (Step 555).

If however, no reply is received within a timeout period, then the initiator system records that a packet was lost, and begins waiting to send the next request packet (Step 560).

After successfully receiving a reply, the initiator system now has four timestamps T1, T2, T3 and T4 (it can use T3=T2 if only a single timestamp was recorded by the responder system). These timestamps are used to update the clock offset bounds and then compute the one-way delay bounds D1, D2 and D3 as per the bounded one-way delay estimation method of FIG. 3. (Step 565) These delay parameters are recorded for later use or display (Step 575).

For convenience, the delay bound parameters may be converted to direct one-way estimates D1+D2/2 and D3+D2/2. It will be understood that this measurement has an error of +−D2/2. For storage purposes the error values can be stored separately from the error bound information, but such specifics will be apparent to the person skilled in the art. A history of these results is storable for subsequent review or assessment. By storing a plurality of such measurements, subsequent review of each of these estimates can be used to determine network traffic activity.

The storage of the actual parameters may be performed by dividing the range of possible delay values into a number of sub-ranges and storing an integer count of occurrences corresponding to each sub-range instead of recording the history of delay values. By choosing a suitable number of sub ranges, this allows a very large number of measured parameters to be stored to the required precision in a compact form. The usage of such a bucketized local buffer can reduce the amount of raw data that needs to be stored for each distribution interval. Once an interval has expired the data within that interval can be written to another storage facility and the local buffer can be updated with new interval information. Within the definition of the number of sub-ranges, it will be understood that appropriate pre-characterization can be used to enable subsequent interrogation of the data received to achieve meaningful results. For example by storing delays (i.e. D1+D2/2, D3+D2/2) in a manner where the data is broken down by site, router, interface. traffic class and time period, the effect is that the user can pick any time period and any traffic category, and get a time-series of the delays experienced by that traffic during the specified time. E.g. you could select the voice traffic class at the London site at 9 am-5 pm last Monday, and get delay information showing the history.

Once complete estimates are provided it is possible to evaluate any changes in the drift and skew and use these updated values for the next iteration (Step 570).

Implementation—Passive

Figure 6:
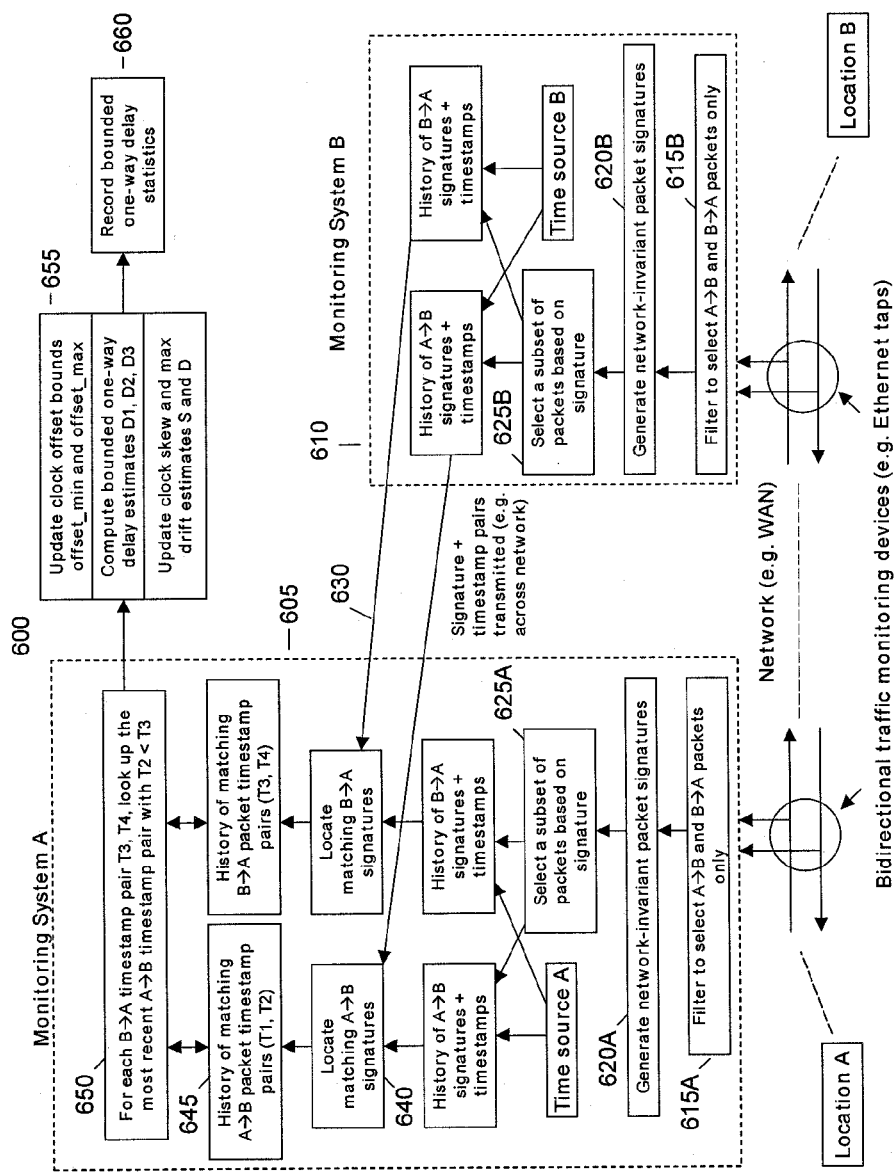
FIG. 6 is an example of a passive measurement tool that can be used to provide for delay measurements between two locations using real network traffic.

The arrangement of FIG. 5 provides for a use of inserted packets into the network traffic, sometimes called active measurement. We now describe an apparatus 600, with reference to FIG. 6, that computes and records bounded one-way delay estimates using the above methods by passively monitoring normal application packets as they each pass by two monitoring points. This permits bounded one-way delay estimates to be generated for real application packets, allowing measurement of the network delays those application packets are experiencing.

Such a passive delay measurement apparatus consists of two or more monitoring systems 605, 610 located separately such that packets travelling back and forth between locations A and B may each be observed by both monitoring systems. The monitoring systems need not be located close to the endpoints of the application traffic being monitored; they just need to be located such that the network path whose delays are to be measured lies between the two monitoring systems.

Each monitoring system has a mechanism for observing packets as they pass by. This could be a passive Ethernet tap, or other device that can copy passing packets such as will be appreciated by the person skilled in the art. Alternatively the monitoring system itself could receive the packets on one network interface and forward them on to their final destination using another network interface while also processing the packet contents as described below.

As the traffic being monitored is real network traffic, there may be large volumes of such traffic passing by each of the monitoring systems. For the sake of expedient and efficient processing it is desirable that such traffic be filtered in some fashion to ensure that a fair representation of the traffic is being analyzed—a sampling of the traffic. Each monitoring system therefore desirably first filters packets (Step 615) to extract only the packets that it wishes to monitor. Filtering or sampling can be provided in a plurality of different manners. For example, if Locations A and B are defined as IP subnets, then the filtering would consist of selecting packets that have a source address within subnet A and a destination address within subnet B, or else have a source address within subnet B and a destination address within subnet A.

As the traffic being monitored represents real traffic there is a requirement for both monitoring systems to be able to identify the traffic that represents the monitored traffic, effectively a determination that a packet seen at one monitoring point is the same packet as that seen at another monitoring point. To achieve this, the monitoring systems compute a network-invariant packet signature for each packet (Step 620). This signature generation should be such that both monitoring systems will generate the same signature when they each see the same packet, but such that it is unlikely two different packets will generate the same signature. For example, it could be a CRC32 hash of the IP length, IP ID, IP offset, IP protocol number, IP source and destination addresses, TCP/UDP port numbers, and the remaining packet payload. Any other suitable signature could also be used. Additionally a secret "salt" value that is shared between the measurement points may be included in the signature computation to ensure that end users of the network cannot directly control the resulting signature.

Since packet signatures need to be transmitted across the network, it is not always desirable to transmit signatures for all packets, so some sampling (Step 625) is useful to reduce the network overhead. This also reduces storage and processing requirements on the monitoring systems. The sampling must be performed in a fashion that will ensure that all monitoring systems retain the same packets. This can be achieved by computing another hash of network invariant packet fields, and then only retaining packets where the resulting hash falls within a fixed subset of the total hash output space. Again, using a shared secret "salt" value ensures that end users cannot directly control which packets get sampled. The use of salt values will be well understood to those in the field of cryptography.

For each packet that is retained after sampling, the signature is recorded along with a timestamp for the observation of the packet. Ideally such timestamps should reflect the time at which the packet passed as accurately as possible, for example by using a network interface card with hardware packet timestamp capabilities.

Each monitoring system records a short (e.g. 30 second) history of selected signature and timestamp pairs. Additionally, some monitoring systems transmit these signature and timestamp pairs to other monitoring systems. In the exemplary sequence diagram of FIG. 6, the transmission (Step 630) is shown as directed from monitoring system B to monitoring system A, but the transmission could be in either or both directions. The signature and timestamp pairs are transmitted with a stream designation so that the receiving monitoring can determine from which connection and direction the pair relates. The pairs may also be batched and/or compressed to improve the efficiency of their use of network resources.

Since there is a possibility of hash collisions between signatures, if any monitoring system observes two identical signatures within its signature history, it excludes such signatures from the signature matching process used to generate timestamp pairs.

When a monitoring system such as monitoring system A in the diagram receives a packet signature and timestamp pair, it looks up the signature in its local history of signature and timestamp pairs (Step 640). If a matching signature is located, then the pair of timestamps is recorded in a buffer associated with the particular packet direction (Step 645). For example, when a signature for a packet from Location A to Location B is found, the timestamps T1 and T2 are recorded in an A→B direction buffer.

Periodically each monitoring system searches for bidirectional packet pairs in its history of signature matches. For example, when an A→B timestamp pair T1, T2 is considered, the monitoring system can search its B→A direction timestamp history buffer for the most recent B→A timestamp pair T3, T4 where T2<T3 (Step 650).

Each such bidirectional packet pair has associated timestamps T1, T2, T3 and T4, so is directly suitable for processing by the bounded one-way delay estimation method outlined above to compute delay bounds D1, D2 and D3, and by the clock skew and maximum drift estimation method to update the skew and maximum drift estimates S and D, (Step 655). These delay parameters are recorded for later use or display, (Step 660).

For convenience, the delay bound parameters may be converted to direct one-way estimates D1+D2/2 and D3+D2/2 as described above. A history of these results is stored.

While the techniques for providing the one way delay measurement require a round trip between two points so as to provide the necessary time stamps T1 to T4, it will be appreciated that the round trip used does not have to consist of packets from the same application in both directions. For example if the predominant traffic between two nodes is unidirectional, i.e. travelling in only one direction, there may not be sufficient round trip measurements to provide the necessary data for the delay estimations. In such circumstances one or both of the monitoring systems could actively insert a return packet to the other location. In such a circumstance the values of T1 and T2 would be provided by a passive packet and the values of T3 and T4 by an active packet.

Tool for Measuring and Analyzing Delays (Incl. Mirror Plots)

As was discussed above, the results of the calculation of the one-way delay estimates for each of the directions can be stored for subsequent analysis. We now describe a computer implemented tool that records and displays bounded one-way delay estimates in a way that takes advantage of format of the bounded delay estimates described in the above methods.

The tool can use either the active or passive measurement techniques described above, or a combination of both. The tool allows its user to configure parameters such as what destination to send active requests to, or what traffic to measure and how to contact the other monitoring system for passive measurement. Once configured, the tool begins collecting bidirectional packet pair measurements and processing them into bounded one-way delay estimates.

The tool records a history of these measurements, for example storing them on disk or in memory. It also can be configured to use summarization techniques such as storing the samples in bucketized sub-ranges to avoid retaining all of the raw data. The use of such data collection will be well understood to those skilled in the art and requires no further explanation here.

One the tool has been installed within the network on which analysis is being conducted, the user of the tool may select a historical time period for which they wish to view bounded one-way delay estimates. Such historical data is useful in providing for an evaluation of the network performance, whether the bandwidth or other network attributes are adequate for the traffic being carried within that network or indeed to monitor for abuse events. The raw or summarized data for this requested period is then retrieved and displayed.

As will be understood from the foregoing, each bidirectional packet pair measurement provided in accordance with the teaching of the invention, results in the three delay bound values D1, D2 and D3 representing outbound, indeterminate and return delays respectively. Since the D2 parameter is effectively an error bound on the D1 and D3 values, it appears that any reporting or display of such measurements would need to display a potentially large error bar corresponding to the D2 value. Traditional methods of providing an historical view would have suffered in providing the user of the tool with an intuitive review of the historical traffic activity.

However in accordance with the teaching of the invention, it is possible to display these measurements in a way that directly conveys their meaning and demonstrates that the D2 term does not represent a large uncertainty in the measurements. The key factors are that the D2 terms from consecutive bidirectional packet pair measurements are highly correlated, and the error is an uncertainty in the direction of a portion of the delay, not an uncertainty in the delay itself.

Figure 7:
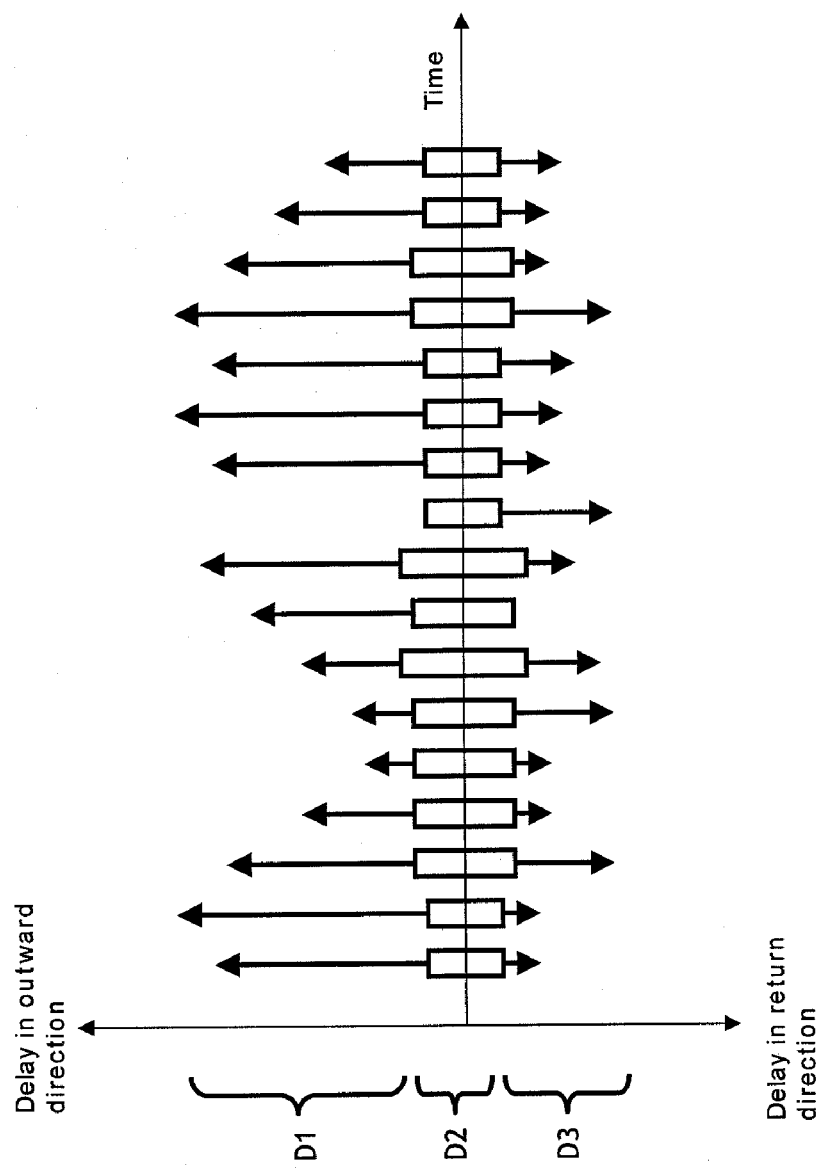
FIG. 7 is an example of a delay analysis tool that can be used to provide for subsequent analysis of the delay experienced within the network.

FIG. 7 shows an example of what is termed a "mirror plot" of bounded one-way delay measurements from bidirectional packet pairs, as provided in accordance with the teaching of the present invention. Each data point on the plot is drawn by centering the D2 term on the X axis, and then plotting the D1 term above it and the D3 term below it. Using the example of FIG. 7, it will be apparent that the predominant delay in the traffic represented is experienced in the outward direction, i.e. the D1 component, whereas the D3 return delay is relatively small for most cases. This also reinforces the understanding that delays experienced by packets in return trips are not symmetrical in nature. It will be understood that using a graphical display in accordance with the teaching of the invention provides for a directional display of the traffic in that the delay in a first direction (D1) is displayed in a first orientation (upwardly) and the delay in the second direction (D3) is displayed in a second orientation (downwardly), each of the two delays being separated by the indeterminate direction delay (D2) which is centered on an axis (in this example the X axis). By providing such a display it is easy for the user, the network administrator in most cases, to evaluate when a delay is being experienced as the relative height of adjacent plots is indicative of the delay being experienced in those defined time periods.

In order to assist in evaluating these delays more efficiently each of the different regions could also be plotted in different colors to distinguish them.

When a plot is desired for a long time period for which many thousands of D1, D2, D3 groups are available, the data can be summarized for display by combining a number of packet pair results into a single item on the display. For example, the tool can display different percentiles of the measured delays as a way of combining many data items into a single display item. Where more information is then required on a specific time period, it is possible to drill down into that data representation to retrieve the individual measurements that are used to generate the summary data. In this way it is possible to provide a high level overview of the traffic activity and then enable the network analyzer to subsequently retrieve more information pertaining to time periods of specific interest such as the occurrence of what appears to be an abuse event.

It will be understood that in accordance with the teaching of the present invention what is provides is a methodology for evaluating one way delays in network traffic between two nodes or points in a network without requiring a synchronization of the clocks at each of those two nodes. Where there are variations in the direction of the delay, it is possible to attribute a direction to the delay experienced so as to evaluate whether the delay experienced in a round trip is dominated more by the outward than the return trip or vice versa. Such evaluation of a one-way delay assists greatly in an understanding of the network behavior and assists in network management such as for example the provision of adequate bandwidth for the traffic, the monitoring of abuse events or indeed the control of certain activities. In order to implement the teaching of the invention a network tool has been described which could be implemented in hardware, software or a combination of both. Furthermore the use of mirror plots which enable a visual identification of the network traffic in an easy to interpret fashion has been described. These exemplary embodiments are provided, it will be understood, to assist in an understanding of the teaching of the invention and it is not intended to limit the invention in any way except as may be deemed necessary in the light of the appended claims. Furthermore, where the invention has been described with reference to specific figure it will be understood that features or components of one figure can be interchanged with those of another figure without departing from the spirit or scope of the invention.

The words comprises/comprising when used in this specification are to specify the presence of stated features, integers, steps or components but does not preclude the presence or addition of one or more other features, integers, steps, components or groups thereof.

The invention claimed is:

1. A method of using two or more round trip measurements between a first and a second node in a network to estimate a delay parameter in traffic between the first and second node, each of the first and second nodes having a first and second clock respectively associated therewith, each measured round trip having timestamps associated therewith, the method comprising for each round trip measurement:

a. shifting, by a processor, values of an upper bound and a lower bound for the clock offset in time difference between the first and second clocks by adding to the values of the upper and lower bounds an estimated long-term relative skew between the clocks since a previous round trip measurement;

b. widening, by the processor, the upper and lower bounds by adding to the upper bound and subtracting from the lower bound a positive estimate of a maximum drift between the clocks since the previous round trip measurement;

c. using, by the processor, the timestamps to lower the upper bound if the upper bound calculated from steps a) and b) is greater than an upper bound calculated using the timestamps;

d. using, by the processor, the timestamps to increase the lower bound if the lower bound calculated from steps a) and b) is lower than a lower bound calculated using the timestamps; and e. using, by the processor, the upper and lower bounds from steps c) and d) in estimation of a one way delay measurement for traffic traveling unidirectionally between the first and second nodes, the one way delay measurement being attributed to a bounded one way directional delay element for traffic traveling in a direction from the first to the second node, a bounded one way directional delay element for traffic traveling in a direction from the second to the first node and a bounded delay element for delay whose attributed direction is indeterminate.

2. The method of claim 1 wherein a first round trip measurement is used to determine offset bounds and a second, subsequent, round trip measurement is used to constrain the determined offset bounds.

3. The method of claim 1 including the periodic updating of the bounded values using subsequent round trip measurements between the first and second nodes.

4. The method of claim 3 wherein each of the subsequent round trip measurements are used to constrain the bounded values.

5. The method of claim 1 wherein the contribution related to clock skew and drift is a modeled contribution.

6. The method of claim 1 wherein multiple iterations of round trip measurements can be used to reduce the bound parameter and therefore give a more accurate estimation of the distribution of the delay in each direction.

7. The method of claim 1 wherein multiple round trip measurements are useable to define a maximum and minimum offset between the first and second clocks.

8. The method of claim 1 wherein each of the first and second clocks are unsynchronized.

9. The method of claim 1 including a storage of the one way delay measurement for traffic traveling unidirectionally between the first and second nodes.

10. The method of claim 9 wherein multiple bounded one way delays are stored, each of the delays providing an indication of network traffic for the time period that delay represents.

11. The method of claim 9 wherein the method includes forming a store, the store having parameters pertaining the delay range, the store being formed by dividing the range of possible delay values into a number of sub-ranges and storing an integer count of occurrences corresponding to each sub-range instead of recording the history of delay values, the store providing a statistical overview of the network behavior for the time period defined for that store.

12. The method of claim 11 wherein multiple stores are formed, each store including information for an appropriate time period, analysis of network traffic being enabled through an interrogation of an appropriate store.

13. The method of claim 1 including passively monitoring normal application packets as they each pass by each of the two nodes.

14. The method of claim 13 wherein the passively monitoring includes a filtering of packets passing the nodes such that the analyzed traffic represents a subset of the total volume of traffic passing the nodes.

15. The method of claim 13 wherein the method includes a determination that a packet seen at one monitoring point is the same packet as that seen at another monitoring point, the determination being effected by a computation of a network-invariant packet signature for each packet.

16. The method of claim 15 wherein an estimation of the one way delay is restricted to those packets identified at each of the two nodes having the same network-invariant packet signature.

17. A network analysis tool configured to provide one-way delay estimates for network traffic traveling between two nodes within a network, the nodes having a first and second clock respectively, the tool including:

a. monitoring stations at each of the two nodes, each of the monitoring stations configured to associate a packet arriving and departing from that node with a time stamp using the clock at that node, b. a processor configured to identify packets making round trips between the two nodes and to use the time stamps from successive round trip measurements to i. shift the values of an upper bound and a lower bound for the clock offset in time difference between the first and second clocks by adding to the values of the upper and lower bounds an estimated long-term relative skew between the clocks since a previous round trip measurement;

ii. widen the upper and lower bounds by adding to the upper bound and subtracting from the lower bound a positive estimate of a maximum drift between the clocks since the previous round trip measurement;

iii. use the timestamps to lower the upper bound if the upper bound calculated from steps i) and ii) is greater than an upper bound calculated using the timestamps;

iv. using the timestamps to increase the lower bound if the lower bound calculated from steps i) and ii) is lower than a lower bound calculated using the timestamps; and v. using the upper and lower bounds from steps iii) and iv) in estimation of a one way delay measurement for traffic traveling unidirectionally between the first and second nodes, the one way delay measurement being attributed to a bounded one way directional delay element for traffic traveling in a direction from the first to the second node, a bounded one way directional delay element for traffic traveling in a direction from the second to the first node and a bounded delay element for delay whose attributed direction is indeterminate.

18. The tool of claim 17 including a data cache configured to store a plurality of the estimated delay measurements.

19. The tool of claim 18 wherein the data cache is configured to store the plurality of delay measurements in a number of sub-ranges, each of the sub-ranges being configured to store an integer count of occurrences corresponding to each sub-range as appropriate.

20. The tool of claim 18 including an interrogator module, the interrogator module being configured to enable a user to interrogate the data cache to evaluate network traffic performance in the time period defined by the stored delay measurements.

21. The tool of claim 20 wherein the interrogator module includes a graphical user interface configured to display historical delay measurements in a time delimited fashion.

22. The tool of claim 21 wherein the graphical user interface is configured to display the delay in a directional fashion, the delay attributed to traffic traveling in a first direction being displayed in a first direction, the delay attributed to traffic traveling in the other direction being displayed in a second opposite direction and the non-directionally attributed delay being displayed between the first and second delay.

23. The tool of claim 22 wherein the height of each of the three delays as displayed is related to its relative delay time.

24. The tool of claim 22 wherein the non-directionally attributed delay is localized about an axis, such that each of successive delay measurements displayed are located about the same axis.

25. The tool of claim 24 wherein the axis is the time axis, provided as an X axis on an X-Y graph, the Y component above and below the X axis being a directional component indicating the direction of the delay.

26. The tool of claim 22 wherein each of the displayed delays are representative of a plurality of component delays, the tool including an analysis component that enables a user to evaluate individual component delays.

* * * * *